United States Patent [19]
Muchin et al.

[11] Patent Number: 5,351,608
[45] Date of Patent: Oct. 4, 1994

[54] BAKEWARE WITH SURFACE TEXTURE

[75] Inventors: Jay Z. Muchin, Manitowoc, Wis.; Dennis W. Miller, Summerville, S.C.

[73] Assignee: Anchor Hocking Corporation, Freeport, Ill.

[21] Appl. No.: 853,293

[22] Filed: Mar. 18, 1992

[51] Int. Cl.⁵ .......................................... A47J 37/01
[52] U.S. Cl. .................................... 99/422; 99/447
[58] Field of Search ............... 99/422, 425, 444, 445, 99/450, DIG. 15, 447; 220/469, 447; 126/390

[56] References Cited

U.S. PATENT DOCUMENTS

| | | | |
|---|---|---|---|
| 199,822 | 1/1878 | Geyser | 99/445 |
| 495,872 | 4/1893 | Ball | 99/422 |
| 1,644,255 | 10/1927 | Kercher et al. | 99/445 |
| 2,257,468 | 9/1941 | Langel | 99/422 |
| 2,618,258 | 11/1952 | Kroyer | 99/422 |
| 2,774,295 | 12/1956 | Watkins | 99/425 |
| 3,545,645 | 12/1970 | Smith | 99/DIG. 15 |
| 3,799,048 | 3/1974 | Finley | 99/425 |
| 4,078,479 | 3/1978 | Mori | 99/422 |
| 4,489,852 | 12/1984 | Logan | 220/469 |
| 4,563,946 | 1/1986 | Barlow et al. | 99/450 |
| 4,676,151 | 6/1987 | Gorsuch et al. | 99/DIG. 15 |
| 4,768,427 | 9/1988 | Cheng | 99/422 |
| 4,785,968 | 11/1988 | Logan et al. | 99/DIG. 15 |

FOREIGN PATENT DOCUMENTS

| | | | |
|---|---|---|---|
| 0104731 | 8/1938 | Australia | 99/422 |
| 1122939 | 9/1956 | France | 99/425 |
| 0315835 | 9/1956 | Switzerland | 99/444 |
| 0459705 | 1/1937 | United Kingdom | 99/425 |
| 0543735 | 3/1942 | United Kingdom | 99/425 |

OTHER PUBLICATIONS

PCT document WO82/04181, Dec. 1982; inventor: Lawrie; priority country: Australia.

*Primary Examiner*—Timothy F. Simone
*Assistant Examiner*—James F. Hook
*Attorney, Agent, or Firm*—Baker & McKenzie

[57] ABSTRACT

A baking device having surface texturing. The baking surface of a cookie sheet, cake pan, pizza pan or jelly roll pan is embossed with generally rounded protrusions and smaller generally crater-like depressions. These surface features provide the baking surface with a non-stick effect. In addition, the protrusions and depressions provide the baking surface with a scratch and stain resistance resulting from the tendency for the surface features to reduce the visibility of scratches and stains which occur in the upper surface of the bakeware.

2 Claims, 1 Drawing Sheet

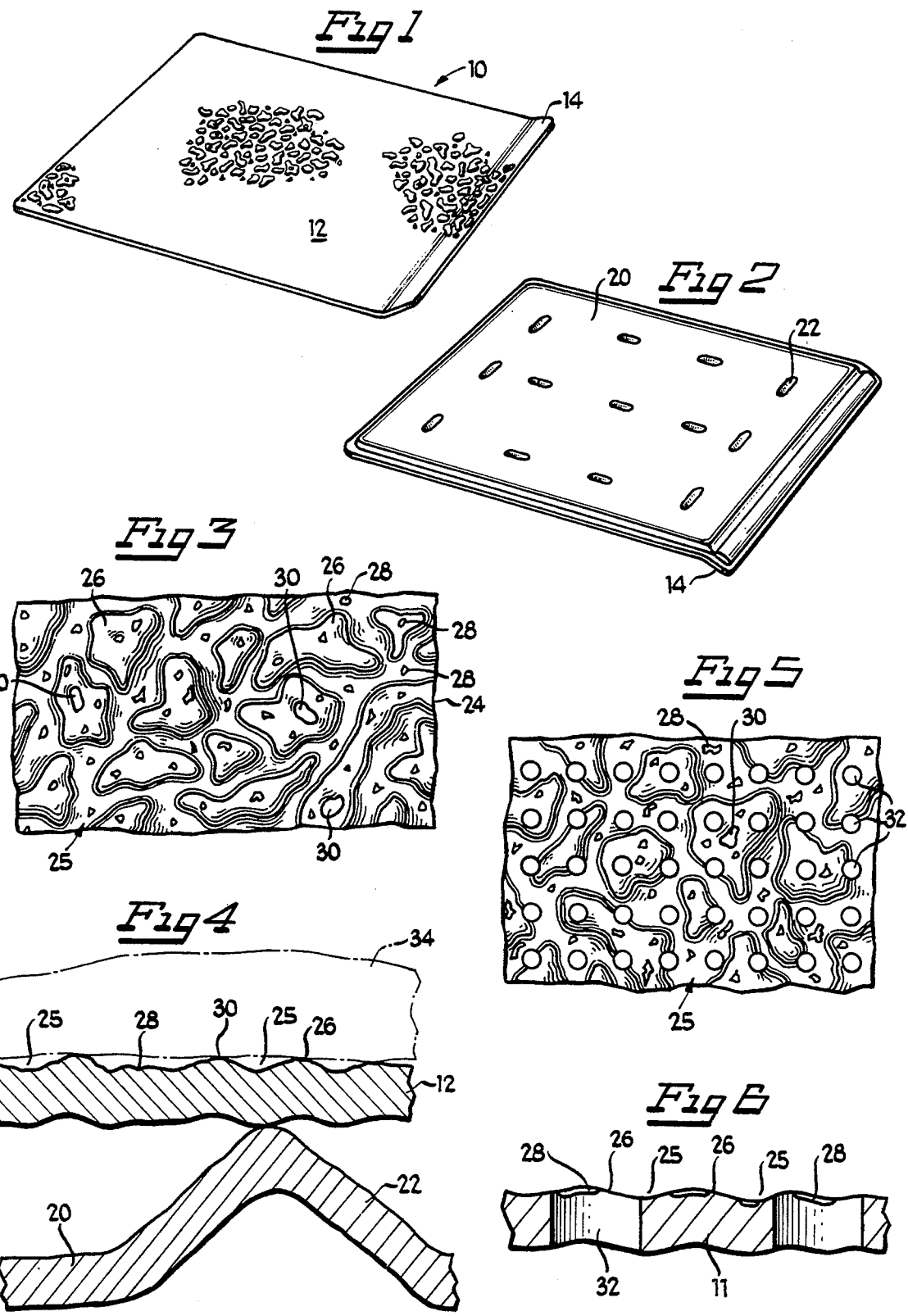

BAKEWARE WITH SURFACE TEXTURE

BACKGROUND AND SUMMARY OF THE INVENTION

The present invention relates to bakeware such as cookie sheets, cake pans, pizza pans, jelly roll pans, and the like. Over the years, such bakeware items have been made of various materials, including, for example, steel, tin, and aluminum.

In some cases, the structural material which comprises the cookie sheet is coated with a non-stick material, such as a polymer. However, such polymers have difficulty withstanding the heat to which bakeware is exposed. In particular, many non-stick surface treatments cannot withstand direct heat such as that which occurs in a broiler. In addition, non-stick surface treatments which are polymeric in nature have very low scratch resistance. As a result, the user is often required to use special plastic spatulas and must handle the bakeware carefully. Even when special hand implements are used with such non-stick polymeric coatings, the coating tends to deteriorate through normal wear and tear such as that which results from washing and stacking of the bakeware.

Polymeric non-stick coatings can significantly affect the cost of producing bakeware. Depending upon the coating applied, special processes may be required to ensure that the coating adheres to the metal comprising the bakeware.

Another disadvantage of some bakeware items is the tendency for the bakeware to become stained. In particular, smooth surfaces on bakeware tend to make stains readily visible. Such stains can be the result of corrosion, or dyes which are present in food which has been cooked on the bakeware, or from burnt food.

It is, therefore, an object of the present invention to provide bakeware which is both scratch and stain resistant.

It is another object of the present invention to provide bakeware which is both economical and attractive.

Another object of the present invention is to provide bakeware which retains its attractiveness over a long period of time, despite repeated rough usage.

A further object of the present invention is to provide bakeware which has a non-stick surface without the use of a polymeric coating.

Still another object of the present invention is to provide low cost bakeware which has a high degree of releasability.

Yet another object of the present invention is to provide bakeware which retains its releasability despite repeated rough usage.

These and other objects of the present invention are achieved with bakeware which includes an aluminum sheet having a texturized upper surface. The texturing is comprised of a plurality of protrusions of various sizes. The protrusions are generally rounded, so as to create a generally undulating surface. The difference between the highest point and the lowest point of the undulating surface (the "textural differential") is preferably about 0.007 inch, and the frequency of the protrusions is preferably about 27 protrusions per square inch.

In one embodiment of the invention, the aluminum sheet having the undulating upper baking surface is attached to a second lower sheet to form an insulated baking device. In a second embodiment of the invention, a single aluminum sheet having an undulating upper baking surface has a series of holes which allow additional heat to flow to the underside of food which is baked on the upper undulating surface. Further texturing may be employed by superimposing a second surface feature on the upper undulating surface of the bakeware. The second feature includes a relatively large number, preferably about 175 per square inch, of smaller crater-like depressions which are present both on and between the undulating protrusions.

BRIEF DESCRIPTION OF THE DRAWINGS

The above described objects and advantages of the invention will be better understood upon a reading of the following specification, read in conjunction with the accompanying drawings wherein:

FIG. 1 is a perspective view of a baking device embodying the present invention;

FIG. 2 is a perspective view of the underside of the baking device shown in FIG. 1;

FIG. 3 is an enlarged plan view of the upper surface of the device shown in FIGS. 1 and 2;

FIG. 4 is a cross-sectional view of the device shown in FIGS. 1 through 3;

FIG. 5 is an enlarged plan view of the upper surface of an alternative embodiment of the present invention; and FIG. 6 is an enlarged cross-sectional view of the device shown in FIG. 5.

DETAILED DESCRIPTION OF THE INVENTION

FIGS. 1 through 4 show one embodiment of the present invention. The cookie sheet 10 includes an upper sheet 12, an upturned edge 14 and a lower sheet 20. Spacing detents 22 are formed in the lower sheet 20 to provide an insulating airspace 25 between the sheets 12 and 20. The upper surface 24 of the upper sheet 12 includes texturing in the form of generally rounded protrusions 26 and crater-like depressions 28. The generally rounded protrusions 26 are discrete formations in the upper surface 24 which make the upper surface 24 generally undulating, as can best be seen in FIG. 4. Some of the protrusions 26 have flats 30 which are the result of a manufacturing operation in which the overall thickness of the upper sheet 12 is maintained at a maximum overall dimension.

The protrusions 26 have a height relative to the lowest point on the upper surface 24 of approximately 0.007 inch. This difference is referred to herein as the "textural differential". The upper and lower sheets 12 and 20, respectively, are preferably made of a relatively ductile metal, such as aluminum, copper, and alloys including those metals. If aluminum is used, the sheets are preferably about 0.3 inches thick. This results in a ratio of the thickness to the textural differential of about 4.3. However, ratios of thickness to textural differential of between about 3.5 and about 5.0 may be used. If a lower ratio is used, the durability and structural integrity of the baking device may suffer. If a higher ratio is used, the cost of the aluminum may become prohibitive.

The frequency of the depressions 28 is about 175 per square inch. However, the frequency of the depressions 28 is not as important as the frequency of protrusions 26, and may be between 0 and 500 per square inch.

FIG. 4 shows that the textural differential provided by the protrusions 26 allows airways 25 to form underneath food 34 which is placed on top of the upper surface 24. The protrusions 26 hold the food 34 out of the airways 25 allowing air to circulate underneath the food 34. This circulation allows for more even distribution of heat. Another advantage of the protrusions 26 is that there is less surface area of the upper surface 24 in contact with the food 34, resulting in a "non-stick" effect. While in some cases, the airways 25 will be initially filled with flowable food product, clogging will not occur in all cases. In some instances, the food rises and lifts out of the airways 25. In other instances, particularly in the case of frozen or prepared foods, the airways remain free to circulate air throughout the cooking process.

It should also be noted that the areas or valleys between the protrusions have an appearance which tends to camouflage any scratches which occur in the upper surface 24. Thus, scratches which inevitably occur in a ductile material such as aluminum will be rendered substantially less visible by the presence of the protrusions 26 and the depressions 28. Similarly, staining which may occur from corrosion, food coloring or burning, also tends to be disguised by the presence of the surface features 26, 28 and 30.

The protrusions 26, depressions 28 and flats 30 are all surface features which are present on the baking surface presented by the upper surface 24 of the upper sheet 12. The lower sheet 20 may but need not have the surface features shown in FIGS. 1 and 3. In the embodiment of the invention shown in FIGS. 1 through 4, the surface features 26, 28 and 30 are disposed over the entire upper surface 24 of the upper sheet 12. However, it may be desirable to provide the surface texturing over only a portion of the upper surface 24 so that a limited baking surface is provide.

The embodiment shown in FIGS. 1 through 4 is an insulated cookie sheet. The upper sheet 12 is initially somewhat larger than the lower sheet 20. The peripheral edge of the upper sheet 12 is bent over to engage the peripheral edge of the lower sheet 20, whereby the upper and lower sheets are joined at their respective peripheries. The spacing detents 22 are distributed generally over the lower sheet to provide the airspace 23.

FIGS. 5 and 6 show a second embodiment of the present invention. In the second embodiment, the baking sheet 11 has protrusions 26, depressions 28 and flats 30 which are substantially the same as those described with reference to FIG. 3 above. In addition, the baking sheet 11 includes holes 32 which allow for additional flow of air through the airways 25 which extend between the protrusions 26. Thus, the apertures, or holes 32, cooperate with the protrusions 26 to enhance the flow of air and heat through the passageways between the protrusions 26. The pattern of holes shown in FIG. 6 is a regular one to facilitate even distribution of heat to the food placed on the upper surface 24 of the sheet 11. U.S. Pat. No. 4,563,946 describes in more detail the advantages of providing a baking sheet with small apertures. The contents of U.S. Pat. No. 4,563,946 is incorporated herein by reference. That patent describes the advantage of the holes 32 as being particularly useful in preparing pizza in order to improve the crispiness of the crust of the pizza. A pizza pan which utilizes both apertures and the undulating protrusions of the present invention will provide a pizza with a more even crispness. This is particularly true in the case of partially cooked frozen pizza, because the airways bounded by the sides of the undulating protrusions and the underside of the frozen pizza will not become filled with dough. Rather, the airways will be substantially free of interruption so that heated air can flow through the holes and through the airways to a majority of the undersurface of the pizza.

While a specific embodiment of the invention has been shown and described, it will be apparent to those skilled in the art that numerous alternatives, modifications, and variations of the embodiment shown can be made without departing from the spirit and scope of the appended claims.

We claim:

1. An improved baking device that is both non-stick and scratch resistant, the baking device comprising:

a first sheet having an upper surface and a lower surface, a second sheet spaced underneath said first sheet, said first and second sheets being joined at their respective peripheries to form an insulated baking device, said second sheet having upwardly extending protrusions which provide spacing means for holding said sheets a predetermined distance apart, said upper surface of said first sheet including a baking area for carrying and supporting an article to be baked, said baking area of said upper surface having roughened surface texturing, said roughened surface texturing providing means for reducing surface contact between said upper surface and a food article placed on said upper surface for baking, said roughened surface texturing also providing means for reducing frictional contact between said upper surface and cooking utensils and cleaning utensils thereby reducing likelihood of scratching said upper surface, said upper surface texturing being comprised of a plurality of different surface features, said plurality including a first surface feature which comprises a series of generally rounded discrete undulating protrusions, said rounded discrete undulating protrusions having an outer periphery that defines a peripheral shape and a surface area, said rounded discrete undulating protrusions varying in peripheral shape, surface area, height and upper surface shape, said upper surface containing between about 25 and 30 protrusions per square inch of surface area, a second surface feature which comprises a series of crater-like depressions with generally sharp and unrounded surface edges, said crater-like depressions having an outer periphery that defines a peripheral shape and a surface area, the outer periphery and surface area of the crater-like depressions being smaller than the outer periphery of the discrete undulating protrusions so that a plurality of crater-like depressions can occur within the periphery of a single discrete undulating protrusion, said crater-like depressions varying in peripheral shape and depth, said upper surface containing from about 150 to about 200 irregularly shaped crater-like depressions per square inch of surface area, said first and second surface features being superimposed on said sheet such that said irregularly shaped crater-like depressions occur both on and between said generally rounded discrete undulating protrusions, said first sheet having a thickness of about 0.003 inch and a ratio of thickness to textural differential of between about 3.5 and 5.0.

2. An improved baking device that is both non-stick and scratch resistant, the baking device comprising:

a first sheet having an upper surface and a lower surface, said upper surface of said first sheet including a baking area for carrying and supporting an article to be baked, said baking area of said upper surface having roughened surface texturing, said roughened surface texturing providing means for reducing surface contact between said upper surface and a food article placed on said upper surface for baking, said roughened surface texturing also providing means for reducing frictional contact between said upper surface and cooking utensils and cleaning utensils thereby reducing likelihood of scratching said upper surface, said upper surface texturing being comprised of a plurality of different surface features, said plurality including a first surface feature which comprises a series of generally rounded discrete undulating protrusions, said rounded discrete undulating protrusions having an outer periphery that defines a peripheral shape and a surface area, said rounded discrete undulating protrusions varying in peripheral shape, height and upper surface shape, said upper surface containing between about 25 and 30 protrusions per square inch of surface area, a second surface feature which comprises a series of crater-like depressions with generally sharp and unrounded surface edges, said crater-like depressions having an outer periphery that defines a peripheral shape and a surface area, the outer periphery and the surface area of the crater-like depressions being smaller than the periphery of the discrete undulating protrusions so that a plurality of crater-like depressions can occur within the outer periphery of a single discrete undulating protrusion, said crater-like depressions varying in peripheral shape and depth, said upper surface containing from about 150 to about 200 irregularly shaped crater-like depressions per square inch of surface area, said first and second surface features being superimposed on said sheet such that said irregularly shaped crater-like depressions occur both on and between said generally rounded discrete undulating protrusions, said first sheet has a ratio of thickness to textural differential of about 4.3.

* * * * *